United States Patent
Ashida et al.

(10) Patent No.: US 12,545,785 B2
(45) Date of Patent: Feb. 10, 2026

(54) ADDITION-CURABLE LIQUID SILICONE RUBBER COMPOSITION FOR AIRBAGS, AND AIRBAG

(71) Applicant: SHIN-ETSU CHEMICAL CO., LTD., Tokyo (JP)

(72) Inventors: Ryo Ashida, Annaka (JP); Shigeru Ubukata, Annaka (JP); Satao Hirabayashi, Annaka (JP); Juri Maekawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 354 days.

(21) Appl. No.: 17/641,274

(22) PCT Filed: Aug. 24, 2020

(86) PCT No.: PCT/JP2020/031753
§ 371 (c)(1),
(2) Date: Mar. 8, 2022

(87) PCT Pub. No.: WO2021/049278
PCT Pub. Date: Mar. 18, 2021

(65) Prior Publication Data
US 2022/0289977 A1 Sep. 15, 2022

(30) Foreign Application Priority Data
Sep. 9, 2019 (JP) ................................ 2019-163601

(51) Int. Cl.
*C08L 83/04* (2006.01)
*B60R 21/235* (2006.01)
*C09D 183/04* (2006.01)
*D06N 3/12* (2006.01)

(52) U.S. Cl.
CPC ............ *C08L 83/04* (2013.01); *B60R 21/235* (2013.01); *C09D 183/04* (2013.01); *D06N 3/128* (2013.01); *B60R 2021/23519* (2013.01); *C08L 2205/025* (2013.01); *C08L 2205/03* (2013.01); *D06N 2211/268* (2013.01)

(58) Field of Classification Search
CPC ........ C08L 83/04; C09D 183/04; D06N 3/128
See application file for complete search history.

(56) References Cited

U.S. PATENT DOCUMENTS

| | | | |
|---|---|---|---|
| 5,258,211 A | 11/1993 | Momii et al. | |
| 2005/0025985 A1 | 2/2005 | Parker | |
| 2005/0165161 A1* | 7/2005 | Igarashi | ................... C08K 3/36 524/865 |
| 2005/0267257 A1* | 12/2005 | Mizushima | ............ D06N 3/128 442/104 |
| 2011/0064882 A1 | 3/2011 | Mizushima et al. | |
| 2012/0301644 A1 | 11/2012 | Blackwood et al. | |
| 2013/0071591 A1 | 3/2013 | Yamamoto et al. | |
| 2013/0225024 A1* | 8/2013 | Mizushima | ......... D06M 15/693 427/386 |
| 2014/0114021 A1* | 4/2014 | Okada | ..................... C08L 83/14 524/852 |
| 2015/0123387 A1* | 5/2015 | Nakamura | .......... D06M 15/693 280/741 |
| 2018/0009984 A1* | 1/2018 | Mizunashi | ............. C08G 77/06 |
| 2020/0070764 A1 | 3/2020 | Ashida et al. | |
| 2020/0157347 A1 | 5/2020 | Mizushima et al. | |

FOREIGN PATENT DOCUMENTS

| | | | | |
|---|---|---|---|---|
| JP | 5-179203 | A | | 7/1993 |
| JP | 07195990 | A | * | 8/1995 ........... B60R 21/235 |
| JP | 2005-48165 | A | | 2/2005 |
| JP | 2010-84081 | A | | 4/2010 |
| JP | 2011-80037 | A | | 4/2011 |
| JP | 2013-516521 | A | | 5/2013 |
| JP | 2013-531695 | A | | 8/2013 |
| JP | 2014-136722 | A | | 7/2014 |
| JP | 2019-19196 | A | | 2/2019 |
| WO | WO 2018/168315 | A1 | | 9/2018 |

OTHER PUBLICATIONS

Machine translation for JPH07-195990. (Year: 1995).*
International Search Report, issued in PCT/JP2020/031753, PCT/ISA/210, dated Oct. 20, 2020.
Written Opinion of the International Searching Authority, issued in PCT/JP2020/031753, PCT/ISA/237, dated Oct. 20, 2020.

* cited by examiner

*Primary Examiner* — Peter Y Choi
(74) *Attorney, Agent, or Firm* — Birch, Stewart, Kolasch & Birch, LLP

(57) ABSTRACT

Provided are an addition-curable liquid silicone rubber composition having exceptional adhesiveness and adhesive durability in a silicone rubber coating layer with respect to an airbag fabric, and an airbag.

An addition-curable liquid silicone rubber composition for airbags having, as essential components:
(A) an organopolysiloxane having a weight-average degree of polymerization of 100-2,000 and containing two or more silicon-atom-bonded alkenyl groups per molecule;
(B) an organohydrogenpolysiloxane containing at least two silicon-atom-bonded hydrogen atoms per molecule;
(C) a silica fine powder having a BET specific surface area of 50 m²/g or higher;
(D) a catalyst for a hydrosilylation reaction;
(E) an organic compound including at least one functional group selected from alkenyl groups, alkoxysilyl groups, and hydrosilyl groups, and at least one isocyanate group, per molecule; and
(F) a condensation catalyst selected from organic titanium compounds, organic zirconium compounds, and organic aluminum compounds.

6 Claims, No Drawings

ADDITION-CURABLE LIQUID SILICONE RUBBER COMPOSITION FOR AIRBAGS, AND AIRBAG

TECHNICAL FIELD

This invention relates to an addition-curable liquid silicone rubber composition suitable for manufacturing airbags and an airbag.

BACKGROUND ART

Heretofore, silicone rubber compositions for airbags have been proposed for forming a rubber coating on the textile surface. Airbags having a silicone rubber coating are advantageously mounted on automobiles and other vehicles because of their airtightness and low combustion rate.

As the silicone coating composition for airbags, Patent Document 1: JP-A 2013-531695 discloses an addition-curable liquid silicone rubber composition comprising a crosslinker having hydrosilyl groups at both ends of the molecular chain in combination with a crosslinker having hydrosilyl groups on side chains, having improved internal pressure retention or airtightness; Patent Document 2: JP-A 2011-080037 discloses an addition-curable liquid silicone rubber composition comprising an organohydrogenpolysiloxane of specific structure having SiH groups as a crosslinker, an organosilicon compound having an epoxy group and a silicon-bonded alkoxy group in the molecule as a tackifying component, and a titanium compound and/or a zirconium compound, the composition being tightly adhesive to base fabrics; and Patent Document 3: JP-A 2013-516521 discloses a method for manufacturing an airbag having airtightness by coating a base fabric with an addition-curable silicone rubber composition comprising a Q unit-containing branched organopolysiloxane as the base polymer.

However, coated base fabrics, which are manufactured by coating prior art addition-curable liquid silicone rubber compositions to airbag base fabrics and curing the coatings, experience considerable drops of adhesion after durability tests such as hot durability test and hot humid durability test, failing to satisfy the adhesion durability required as airbag base fabrics.

PRIOR ART DOCUMENTS

Patent Documents

Patent Document 1: JP-A 2013-531695
Patent Document 2: JP-A 2011-080037
Patent Document 3: JP-A 2013-516521

SUMMARY OF INVENTION

Technical Problem

An object of the invention, which has been made under the above-mentioned circumstances, is to provide an addition-curable liquid silicone rubber composition which forms a silicone rubber coating layer having improved adhesion to airbag base fabrics and adhesion durability, and an airbag.

Solution to Problem

Making extensive investigations to attain the above object, the inventors have found that when an addition-curable liquid silicone rubber composition comprising components (A) to (F) as essential components is coated to the surface of an airbag base fabric and heat cured, the silicone rubber-coated airbag base fabric has improved adhesion to the base fabric and adhesion durability. The invention is predicated on this finding.

Accordingly, the invention provides an addition-curable liquid silicone rubber composition for airbags and an airbag as defined below.

[1]
An addition-curable liquid silicone rubber composition for airbags, comprising as essential components:

(A) 100 parts by weight of an organopolysiloxane containing at least two silicon-bonded alkenyl groups per molecule, having a weight average degree of polymerization of 100 to 2,000, and being liquid at 25° C., (B) an organohydrogenpolysiloxane containing at least two silicon-bonded hydrogen atoms (or SiH groups) per molecule, and being liquid at 25° C., in an amount to provide 1 to 10 moles of SiH groups in component (B) per mole of total silicon-bonded alkenyl groups in component (A), (C) 1 to 50 parts by weight of finely divided silica having a BET specific surface area of at least 50 $m^2/g$, (D) a hydrosilylation reaction catalyst in an amount to provide 1 to 500 ppm by weight of catalyst metal element based on the total weight of components (A) to (C), (E) 0.1 to 10 parts by weight of an organic compound containing at least one functional group selected from alkenyl, alkoxysilyl, and hydrosilyl groups and at least one isocyanate group per molecule, and (F) 0.1 to 5 parts by weight of at least one condensation catalyst selected from organotitanium compounds, organozirconium compounds, and organoaluminum compounds.

[2]
The addition-curable liquid silicone rubber composition of [1] wherein component (E) is 3-isocyanatopropyltrimethoxysilane or 3-isocyanatopropyltriethoxysilane.

[3]
The addition-curable liquid silicone rubber composition of [1] or [2] wherein the finely divided silica as component (C) is a wet silica having a $Na^+$ ion content of up to 0.35% by weight calculated as $Na_2O$.

[4]
The addition-curable liquid silicone rubber composition of any one of [1] to [3], further comprising (G) an organopolysiloxane resin of three-dimensional network structure in an amount of 0.1 to 100 parts by weight per 100 parts by weight of component (A).

[5]
An airbag comprising an airbag base fabric and a cured film of the addition-curable liquid silicone rubber composition of any one of [1] to [4] thereon.

Advantageous Effects of Invention

The invention provides an addition-curable liquid silicone rubber composition for airbags capable of forming a silicone rubber coating layer having improved adhesion to airbag base fabrics and adhesion durability, and an airbag.

DESCRIPTION OF EMBODIMENTS

Now the invention is described in detail. Notably, throughout the disclosure, the viscosity is measured at 25° C. by a rotational viscometer according to the method of JIS K 7117-1: 1999. The degree of polymerization (DOP) is determined as a weight average degree of polymerization (weight average molecular weight) by gel permeation chromatography (GPC) using toluene as developing solvent versus polystyrene standards.

Addition-Curable Liquid Silicone Rubber Composition

The invention is directed to an addition-curable liquid silicone rubber composition for airbags which comprises the following components (A) to (F) and is liquid at room temperature (25° C.). The components are described below in detail.

Component (A)

Component (A) is an organopolysiloxane containing at least two silicon-bonded alkenyl groups per molecule, having a weight average DOP of 100 to 2,000, and being liquid at 25° C. It is a base polymer or main component of the composition.

The molecular structure of component (A) may be a linear, cyclic or branched structure, for example. It is preferably a linear diorganopolysiloxane having a backbone consisting essentially of repeating diorganosiloxane units and capped with triorganosiloxy groups at both ends of the molecular chain. Where the molecular structure of the organopolysiloxane as component (A) is linear or branched, the position of a silicon atom in the organopolysiloxane molecule to which the alkenyl group is attached may be either one or both of the end of the molecular chain (i.e., triorganosiloxy group) and a midway point of the molecular chain (i.e., difunctional diorganosiloxane unit or trifunctional monoorganosilsesquioxane unit at a non-terminal position of the molecular chain). A linear diorganopolysiloxane containing at least alkenyl groups attached to silicon atoms at both ends of the molecular chain is especially preferred as component (A).

In component (A), the silicon-bonded alkenyl group typically has 2 to 8 carbon atoms, preferably 2 to 4 carbon atoms. Examples include vinyl, allyl, propenyl, butenyl, pentenyl, hexenyl, cyclohexenyl, and heptenyl, with vinyl being preferred.

In component (A), the content of silicon-bonded alkenyl groups is preferably of the order of 0.001 to 10 mol %, more preferably 0.01 to 5 mol % based on the overall silicon-bonded monovalent organic groups (i.e., substituted or unsubstituted monovalent hydrocarbon groups).

In component (A), the silicon-bonded monovalent organic groups other than the alkenyl group are, for example, identical or different, substituted or unsubstituted monovalent hydrocarbon groups, typically having 1 to 12 carbon atoms, preferably 1 to 10 carbon atoms.

Examples thereof include alkyl groups such as methyl, ethyl, propyl, butyl, pentyl, hexyl, cyclohexyl, and heptyl; aryl groups such as phenyl, tolyl, xylyl, and naphthyl; aralkyl groups such as benzyl and phenethyl; and halogenated alkyl groups such as chloromethyl, 3-chloropropyl, and 3,3,3-trifluoropropyl. Methyl is preferred. It is noted that the organopolysiloxane as component (A) is free of isocyanate groups.

Component (A) has a weight average DOP of 100 to 2,000, preferably 150 to 1,000. With a weight average DOP of less than 100, the resulting silicone rubber may have poor mechanical properties. With a weight average DOP in excess of 2,000, the resulting silicone rubber composition may have too high a viscosity, which is detrimental to coating operation.

Examples of the organopolysiloxane as component (A) include molecular both end trimethylsiloxy-capped dimethylsiloxane/methylvinylsiloxane copolymers, molecular both end trimethylsiloxy-capped methylvinylpolysiloxane, molecular both end trimethylsiloxy-capped dimethylsiloxane/methylvinylsiloxane/methylphenylsiloxane copolymers, molecular both end dimethylvinylsiloxy-capped dimethylpolysiloxane, molecular both end dimethylvinylsiloxy-capped methylvinylpolysiloxane, molecular both end dimethylvinylsiloxy-capped dimethylsiloxane/methylvinylsiloxane copolymers, molecular both end dimethylvinylsiloxy-capped dimethylsiloxane/methylvinylsiloxane/methylphenylsiloxane copolymers, molecular both end divinylmethylsiloxy-capped dimethylpolysiloxane, molecular both end divinylmethylsiloxy-capped dimethylsiloxane/methylvinylsiloxane copolymers, molecular both end trivinylsiloxy-capped dimethylpolysiloxane, molecular both end trivinylsiloxy-capped dimethylsiloxane/methylvinylsiloxane copolymers, and mixtures of two or more of the foregoing organopolysiloxanes.

The organopolysiloxane as component (A) may be used alone or in admixture.

Component (B)

Component (B) is an organohydrogenpolysiloxane which mainly acts as a crosslinker or curing agent by evoking hydrosilylation or addition reaction with alkenyl groups in component (A).

The molecular structure of component (B) may be any of linear, cyclic, branched and three-dimensional network (resinous) structures, for example. It should have at least 2, preferably at least 3 silicon-bonded hydrogen atoms (or SiH groups) per molecule, typically 2 to 300, preferably 3 to 200, more preferably 4 to 100 SiH groups per molecule, and is liquid at 25° C. The SiH groups may be located at terminal, pendant, or both terminal and pendant positions of the molecular chain.

The organohydrogenpolysiloxane typically has the average compositional formula (1).

[Chem. 1]

$$R^1_a H_b SiO_{(4-a-b)/2} \quad (1)$$

In formula (1), $R^1$ which may be the same or different is a silicon-bonded substituted or unsubstituted monovalent hydrocarbon group typically having 1 to 12 carbon atoms, preferably 1 to 10 carbon atoms, free of aliphatic unsaturated bond such as alkenyl. Examples include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl, and naphthyl; aralkyl groups such as benzyl, phenylethyl and phenylpropyl; substituted forms of the foregoing hydrocarbon groups in which some or all hydrogen atoms are substituted by halogen atoms (e.g., fluorine, bromine and chlorine), such as chloromethyl, chloropropyl, bromoethyl, and trifluoropropyl. Of these, alkyl and aryl groups are preferred as $R^1$, with methyl being more preferred. The subscript "a" is a positive number of 0.7 to 2.1, b is a positive number of 0.001 to 1.0, and a+b is 0.8 to 3.0. Preferably, "a" is a positive number of 1.0 to 2.0, b is a positive number of 0.01 to 1.0, and a+b is 1.5 to 2.5. It is noted that the organohydrogenpolysiloxane as component (B) is free of isocyanate groups.

Examples of the organohydrogenpolysiloxane as component (B) include 1,1,3,3-tetramethyldisiloxane, 1,3,5,7-tetramethylcyclotetrasiloxane, tris(hydrogendimethylsiloxy)

methylsilane, tris(hydrogendimethylsiloxy)phenylsilane, methylhydrogencyclopolysiloxane, methylhydrogensiloxane/dimethylsiloxane cyclic copolymers, molecular both end trimethylsiloxy-capped methylhydrogenpolysiloxane, molecular both end trimethylsiloxy-capped dimethylsiloxane/methylhydrogensiloxane copolymers, molecular both end trimethylsiloxy-capped dimethylsiloxane/methylhydrogensiloxane/methylphenylsiloxane copolymers, molecular both end trimethylsiloxy-capped dimethylsiloxane/methylhydrogensiloxane/diphenylsiloxane copolymers, molecular both end dimethylhydrogensiloxy-capped methylhydrogenpolysiloxane, molecular both end dimethylhydrogensiloxy-capped dimethylpolysiloxane, molecular both end dimethylhydrogensiloxy-capped dimethylsiloxane/methylhydrogensiloxane copolymers, molecular both end dimethylhydrogensiloxy-capped dimethylsiloxane/methylphenylsiloxane copolymers, molecular both end dimethylhydrogensiloxy-capped dimethylsiloxane/diphenylsiloxane copolymers, molecular both end dimethylhydrogensiloxy-capped methylphenylpolysiloxane, molecular both end dimethylhydrogensiloxy-capped diphenylpolysiloxane; the foregoing compounds in which some or all methyl groups are replaced by other alkyl groups such as ethyl and propyl; organosiloxane copolymers consisting of siloxane units of the formula: $R^2{}_3SiO_{0.5}$, siloxane units of the formula: $R^2{}_2HSiO_{0.5}$, and siloxane units of the formula: $SiO_2$, organosiloxane copolymers consisting of siloxane units of the formula: $R^2{}_2HSiO_{0.5}$ and siloxane units of the formula: $SiO_2$, organosiloxane copolymers consisting of siloxane units of the formula: $R^2HSiO$ and siloxane units of the formula: $R^2SiO_{0.5}$ or siloxane units of the formula: $HSiO_{0.5}$, and mixtures of two or more of the foregoing organopolysiloxanes. Herein $R^2$ is a $C_1$-$C_{12}$, preferably $C_1$-$C_{10}$ monovalent hydrocarbon group other than alkenyl.

Component (B) is typically blended in an amount to give 1 to 10 moles, preferably 1.2 to 9 moles, more preferably 1.5 to 8 moles of SiH groups in component (B) per mole of total silicon-bonded alkenyl groups in component (A), differently stated, to give 1 to 10, preferably 1.2 to 9, more preferably 1.5 to 8 SiH groups in component (B) per silicon-bonded alkenyl group in component (A).

If the amount of SiH groups in component (B) is less than 1 mole per mole of total silicon-bonded alkenyl groups in component (A), the resulting composition may be less curable. If the amount of SiH groups is more than 10 moles, the resulting silicone rubber cured product may have extremely low heat resistance.

The organohydrogenpolysiloxane as component (B) may be used alone or in admixture.

Component (C)

Component (C) is finely divided silica which serves as a reinforcing filler for imparting strength to the silicone rubber cured product of the composition. Use of finely divided silica enables to form coating films having necessary strength for the invention. The finely divided silica must have a BET specific surface area of at least 50 m²/g, preferably 50 to 400 m²/g, and more preferably 100 to 300 m²/g. Silica with a specific surface area of less than 50 m²/g fails to impart satisfactory strength properties.

The finely divided silica may be any of conventional well-known silica species used as reinforcing filler in silicone rubber as long as the specific surface area falls within the range. Examples include fumed silica and precipitated silica (wet silica). Wet silica is preferred because the resulting composition has a low viscosity and is efficient to work.

In the embodiment wherein wet silica is used as component (C), the silica should preferably have a $Na^+$ ion content of up to 0.35% by weight calculated as $Na_2O$. It is well known that since wet silica is generally prepared from sodium silicate, $Na^+$ ions are left therein as impurity. When a silicone rubber composition is blended and filled with such wet silica, flame retardance declines. Therefore, where wet silica is blended, the silica should have a $Na^+$ ion content of up to 0.35% by weight, preferably up to 0.30% by weight calculated as $Na_2O$.

Prior to use, the reinforcing finely divided silica may be surface-treated with surface treating agents, for example, (typically hydrolyzable) organosilicon compounds such as chlorosilanes, alkoxysilanes, and organosilazanes to render the surface hydrophobic. In this embodiment, the finely divided silica may be previously subjected in powder state to direct surface hydrophobic treatment with the surface treating agent prior to use. Alternatively, the surface treating agent is added to the silica during milling with a silicone oil, for example, the alkenyl-containing organopolysiloxane as component (A) so that the silica is hydrophobized on surface.

With respect to the ordinary treatment of component (C), surface treatment by a well-known technique is possible. For example, untreated finely divided silica and the surface treating agent are fed to a mechanical milling equipment closed at atmospheric pressure or a fluidized bed, where they are mixed at room temperature (25° C.) or heat treated at elevated temperature optionally in the presence of an inert gas. In some cases, water or a catalyst (e.g., hydrolysis promoter) may be used to promote the surface treatment. The milling is followed by drying, obtaining surface-treated finely divided silica. The amount of the surface treating agent may be equal to or greater than the amount computed from the area to be covered with the surface treating agent.

Examples of the surface treating agent include silazanes such as hexamethyldisilazane and 1,1,3,3,5,5-hexamethylcyclotrisilazane, silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, and chloropropyltrimethoxysilane, polymethylsiloxanes, and organohydrogenpolysiloxanes. Hydrophobic finely divided silica which has been surface-treated with these agents may be used. Of the surface treating agents, silane coupling agents and silazanes are preferred.

Component (C) is blended in an amount of 1 to 50 parts by weight, preferably 10 to 30 parts by weight per 100 parts by weight of the organopolysiloxane as component (A). Too less amounts fail to acquire the necessary strength. If the amount is too much, the composition may build up its viscosity and lose fluidity, with coating operation being disturbed.

The finely divided silica as component (C) may be used alone or in admixture.

Component (D)

Component (D) is a hydrosilylation reaction catalyst, which mainly promotes addition reaction of silicon-bonded alkenyl groups in component (A) to SiH groups in component (B). Although the hydrosilylation reaction catalyst is not particularly limited, examples thereof include platinum group metals such as platinum, palladium and rhodium;

chloroplatinic acid; alcohol-modified chloroplatinic acids; coordination compounds of chloroplatinic acid with olefins, vinylsiloxanes or acetylene compounds; and platinum group metal compounds such as tetrakis(triphenylphosphine)palladium and chlorotris(triphenylphosphine)rhodium. Of these, the platinum group metal compounds are preferred.

Component (D) may be used in a catalytic amount, specifically in such an amount as to give 1 to 500 ppm, preferably 10 to 100 ppm of a catalyst metal element based on the total weight of components (A) to (C). If the amount of the catalyst is too small, the addition reaction may be noticeably retarded or the composition may not cure. If the amount is too large, the cured product may have low heat resistance.

The hydrosilylation reaction catalyst as component (D) may be used alone or in admixture.

Component (E)

Component (E) is an organic compound containing at least one functional group selected from alkenyl, alkoxysilyl, and hydrosilyl groups and at least one isocyanate group per molecule. It is added to help the silicone rubber composition develop and enhance its adhesion to airbag base fabrics.

Any organic compounds may be used as long as they meet the above conditions. Preferred are organosilicon compounds having at least one isocyanate group and at least one alkoxysilyl (i.e., silicon-bonded alkoxy group) group per molecule.

Examples of the organic compound as component (E) include silane coupling agents containing an isocyanate group (i.e., organoalkoxysilanes containing an isocyanate functional group) such as 3-isocyanatopropyltrimethoxysilane and 3-isocyanatopropyltriethoxysilane; organic compounds containing an alkenyl group and an isocyanate group in the molecule such as vinyl isocyanate, allyl isocyanate, 1-butene-4-isocyanate, 1-vinyl-2-isocyanatobenzene, 1-vinyl-3-isocyanatobenzene, 1-vinyl-4-isocyanatobenzene, 1-allyl-2-isocyanatobenzene, 1-allyl-3-isocyanatobenzene, and 1-allyl-4-isocyanatobenzene; organohydrogensiloxanes containing an isocyanate functional group, represented by the chemical formulae below; mixtures of two or more of the foregoing; and partial hydrolytic condensates of one or more of the foregoing. Inter alia, 3-isocyanatopropyltrimethoxysilane or 3-isocyanatopropyltriethoxysilane is preferred.

[Chem. 2]

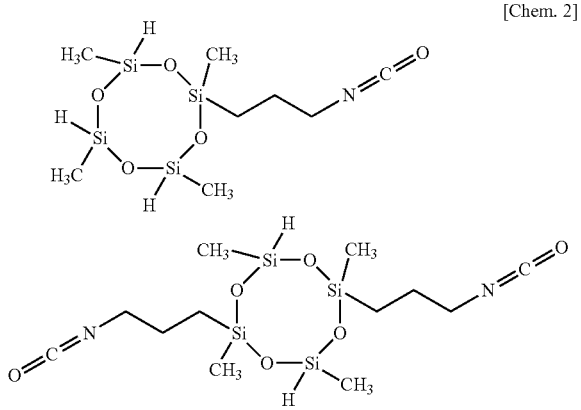

-continued

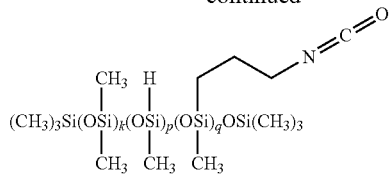

Herein k is an integer of 0 to 40, preferably 0 to 20, p is an integer of 1 to 40, preferably 1 to 20, q is an integer of 1 to 10, preferably 1 to 5, and k+p+q is an integer of 2 to 90, preferably 2 to 45.

Component (E) is blended in an amount of 0.1 to 10 parts by weight, preferably 0.25 to 5 parts by weight per 100 parts by weight of the organopolysiloxane as to component (A). If the amount of component (E) is less than 0.1 part by weight, the resulting composition may not develop a sufficient bonding force. If the amount exceeds 10 parts by weight, the resulting composition may build up its thixotropy and lose fluidity, with coating operation being disturbed.

When component (E) contains an alkenyl group and/or SiH group, the total amount of SiH groups in components (B) and (E) is 1 to 10 moles, preferably 1.2 to 9 moles, more preferably 1.5 to 8 moles per mole of total silicon-bonded alkenyl groups in components (A) and (E), differently stated, the total number of SiH groups in components (B) and (E) is 1 to 10, preferably 1.2 to 9, more preferably 1.5 to 8 per silicon-bonded alkenyl group in components (A) and (E). If the total amount of SiH groups is less than 1 mole per mole of total silicon-bonded alkenyl groups in the composition, the composition may not cure fully or develop a sufficient bonding force. If the amount of SiH groups exceeds 10 moles, the resulting silicone rubber cured product may have extremely poor heat resistance.

Component (E) may be used alone or in admixture.

Component (F)

Component (F) is a condensation catalyst which is at least one compound selected from organotitanium compounds, organozirconium compounds and organoaluminum compounds and serves as a condensation co-catalyst for the tackifying functional group in component (E).

Examples of component (F) include titanium-based condensation co-catalysts (titanium compounds), for instance, organic titanates such as titanium tetraisopropoxide, titanium tetra-n-butoxide, and titanium tetra-2-ethylhexoxide and organotitanium chelate compounds such as titanium diisopropoxybis(acetylacetonate), titanium diisopropoxybis (ethylacetoacetate), and titanium tetraacetylacetonate;

zirconium-based condensation co-catalysts (zirconium compounds), for instance, organozirconium esters such as zirconium tetra-n-propoxide and zirconium tetra-n-butoxide and organozirconium chelate compounds such as zirconium tributoxymonoacetylacetonate, zirconium monobutoxyacetylacetonate-bis(ethylacetoacetate), and zirconium tetraacetylacetonate; and aluminum-based condensation co-catalysts, for instance, organic aluminates such as aluminum sec-butoxide, and organoaluminum chelate compounds such as aluminum trisacetylacetonate, aluminum bisethylacetoacetate monoacetylacetonate, and aluminum trisethylacetoacetate.

The amount of component (F) blended is 0.1 to 5 parts by weight, preferably 0.2 to 4 parts by weight per 100 parts by weight of component (A). An amount in the range ensures that the cured product has improved adhesion durability and heat resistance under hot humid conditions.

Component (F) may be used alone or in admixture.

Besides the foregoing components (A) to (F), optional other components may be blended in the composition as long as the objects of the invention are not impaired. Suitable other components are shown below while each component may be used alone or in admixture.

Component (G)

Component (G) is an organopolysiloxane resin of three-dimensional network (resinous) structure, preferably an organopolysiloxane resin of 3D network structure which is basically composed of branched chain siloxane units of at least one type selected from trifunctional $R^3SiO_{3/2}$ units and tetrafunctional $SiO_2$ units, and optionally containing monofunctional $R^3_3SiO_{1/2}$ units and/or difunctional $R^3_2SiO_{2/2}$ units, and serves as a flame retardant. It is noted that the organopolysiloxane resin is free of silicon-bonded hydrogen atoms (or SiH groups).

In the above formulae, $R^3$ is each independently a substituted or unsubstituted monovalent hydrocarbon group of typically 1 to 12 carbon atoms, preferably 1 to 10 carbon atoms, more preferably 1 to 8 carbon atoms, examples of which are as exemplified above for the alkenyl group and monovalent organic group (substituted or unsubstituted monovalent hydrocarbon group) described in conjunction with component (A). Illustrative examples include alkenyl groups such as vinyl, allyl, propenyl, butenyl, pentenyl, hexenyl, cyclohexenyl, and heptenyl; alkyl groups such as methyl, ethyl, propyl, butyl, pentyl, hexyl, cyclohexyl, and heptyl; aryl groups such as phenyl, tolyl, xylyl, and naphthyl; aralkyl groups such as benzyl and phenethyl; and halo-substituted alkyl groups such as chloromethyl, 3-chloropropyl, and 3,3,3-trifluoropropyl. Inter alia, methyl and vinyl are preferred.

In component (G), the content of silicon-bonded alkenyl group is preferably 0 to about 10 mol %, more preferably about 2 to about 8 mol % based on the overall silicon-bonded monovalent organic groups (substituted or unsubstituted monovalent hydrocarbon groups).

While the organopolysiloxane resin as component (G) optionally contains $R^3_3SiO_{1/2}$ units and/or $R^3_2SiO_{2/2}$ units as mentioned above, their total content is preferably 0 to 70 mol %, more preferably 0 to 50 mol % of the organopolysiloxane resin as component (G).

The organopolysiloxane resin as component (G) preferably has a weight average molecular weight of 2,000 to 50,000, more preferably 4,000 to 20,000 as measured by GPC versus polystyrene standards using toluene as developing solvent. A Mw in the range ensures that the liquid silicone rubber composition has an appropriate viscosity for coating operation and exerts a satisfactory flame retardance-improving effect.

Examples of the organopolysiloxane resin as component (G) include organosiloxane copolymers consisting of siloxane units of the formula $R^4_3SiO_{1/2}$, siloxane units of the formula $R^4_2R^5SiO_{1/2}$, siloxane units of the formula $R^4_2SiO$, and siloxane units of the formula $SiO_2$; organosiloxane copolymers consisting of siloxane units of the formula $R^4_3SiO_{1/2}$, siloxane units of the formula $R^4_2R^5SiO_{1/2}$, and siloxane units of the formula $SiO_2$; organosiloxane copolymers consisting of siloxane units of the formula $R^4_2R^5SiO_{1/2}$, siloxane units of the formula $R^4_2SiO$, and siloxane units of the formula $SiO_2$; organosiloxane copolymers consisting of siloxane units of the formula $R^4R^5SiO$, siloxane units of the formula $R^4SiO_{3/2}$, and siloxane units of the formula $R^5SiO_{3/2}$; and mixtures of two or more of the foregoing organosiloxane copolymers.

In the above formulae, $R^4$ is each independently a substituted or unsubstituted monovalent hydrocarbon group of typically 1 to 12 carbon atoms, preferably 1 to 10 carbon atoms, exclusive of alkenyl group. Examples include alkyl groups such as methyl, ethyl, propyl, butyl, pentyl, hexyl, cyclohexyl, and heptyl; aryl groups such as phenyl, tolyl, xylyl, and naphthyl; aralkyl groups such as benzyl and phenethyl; and halogenated alkyl groups such as chloromethyl, 3-chloropropyl, and 3,3,3-trifluoropropyl. Inter alia, methyl is preferred.

$R^5$ is an alkenyl group of typically 2 to 8 carbon atoms, preferably 2 to 4 carbon atoms such as vinyl, allyl, butenyl, pentenyl, hexenyl, and heptenyl, with vinyl being most preferred.

When used, the amount of component (G) blended is 0.1 to 100 parts by weight, preferably 1 to 90 parts by weight, more preferably 3 to 80 parts by weight per 100 parts by weight of the organopolysiloxane as component (A). An amount in the range ensures a satisfactory flame retardance-improving effect and is cost effective.

The organopolysiloxane resin of 3D network structure as component (G) may be used alone or in admixture.

Reaction Inhibitor

A reaction inhibitor is not particularly limited as long as it is a compound that exerts a cure inhibitory effect to the hydrosilylation reaction catalyst as component (D). The inhibitor may be selected from conventional well-known compounds. Examples include phosphorus-containing compounds such as triphenylphosphine; nitrogen-containing compounds such as tributylamine, tetramethylethylenediamine, and benzotriazole; sulfur-containing compounds; acetylene compounds such as acetylene alcohols; compounds containing at least two alkenyl groups; hydroperoxy compounds; and maleic acid derivatives.

Since the extent of the cure inhibitory effect of the reaction inhibitor varies with the chemical structure of the inhibitor, it is preferred to adjust the amount of reaction inhibitor to be optimum whenever a particular reaction inhibitor is selected. When an optimum amount of the reaction inhibitor is added, the composition remains stable during long-term shelf storage at room temperature and is still effectively curable.

Non-Reinforcing Filler

Suitable fillers other than the finely divided silica as component (C) include fillers such as crystalline silica (e.g., quartz flour with a BET specific surface area of less than 50 m$^2$/g), organic resin hollow fillers, fumed titanium dioxide, magnesium oxide, zinc oxide, iron oxide, aluminum hydroxide, magnesium carbonate, calcium carbonate, zinc carbonate, carbon black, diatomaceous earth, talc, kaolinite, and glass fibers; the foregoing fillers which have been surface treated to be hydrophobic with organosilicon compounds such as organoalkoxysilane compounds, organochlorosilane compounds, organosilazane compounds, and low-molecular-weight siloxane compounds.

Adhesive Component

An adhesive component other than component (E) is typically an organosilicon compound containing a tackifying functional group. Suitable tackifying functional groups include epoxy, alkoxysilyl (silicon-bonded alkoxy), hydrosilyl, acryloyl, and methacryloyl groups. This component is definitely distinguished from component (E) in that it is free of an isocyanate group.

Any organosilicon compounds may be used as long as they have the tackifying functional group. Preferred are organosilicon compounds having at least one functional group selected from alkoxysilyl, alkenyl and hydrosilyl groups and at least one functional group selected from epoxy, acryloyl and methacryloyl groups per molecule. More preferred from the aspect of adhesion development are organosilicon compounds having at least one epoxy group and at least one alkoxysilyl group.

The epoxy group is preferably bonded to a silicon atom in the form of a glycidoxyalkyl group such as glycidoxypropyl, or an epoxy-containing cyclohexylalkyl group such as 2,3-epoxycyclohexylethyl or 3,4-epoxycyclohexylethyl.

The alkoxysilyl group is preferably bonded to a silicon atom to form a trialkoxysilyl group such as trimethoxysilyl or triethoxysilyl, or an alkyldialkoxysilyl group such as methyldimethoxysilyl, ethyldimethoxysilyl, methyldiethoxysilyl or ethyldiethoxysilyl.

Examples of the adhesive component (organosilicon compound) other than component (E) include epoxy-containing silane coupling agents (i.e., epoxy functionality-containing organoalkoxysilanes) such as γ-glycidoxypropyltriethoxysilane, γ-glycidoxypropylmethyldiethoxysilane, (3,4-epoxycyclohexylethyl)trimethoxysilane, (3,4-epoxycyclohexylethyl)triethoxysilane, (3,4-epoxycyclohexylethyl)methyldimethoxysilane, (3,4-epoxycyclohexylethyl)methyldiethoxysilane, (2,3-epoxycyclohexylethyl)triethoxysilane, (2,3-epoxycyclohexylethyl)methyldimethoxysilane, (2,3-epoxycyclohexylethyl)methyldiethoxysilane; acrylic silane coupling agents (i.e., acrylic functionality-containing organoalkoxysilanes) such as 3-acryloxypropyltrimethoxysilane; methacrylic silane coupling agents (i.e., methacrylic functionality-containing organoalkoxysilanes) such as 3-methacryloxypropyltrimethoxysilane; mixtures of two or more of the foregoing, and partial hydrolytic condensates of one or more of the foregoing.

The adhesive component other than component (E) is blended in an amount of 0.1 to 10 parts by weight, preferably 0.25 to 5 parts by weight per 100 parts by weight of the organopolysiloxane as component (A). If the amount is less than 0.1 part by weight, the resulting composition may not develop a sufficient bonding force. If the amount exceeds 10 parts by weight, the resulting composition may build up its thixotropy and lose fluidity, with coating operation being disturbed.

Other Components

There may be further included organopolysiloxanes having one silicon-bonded hydrogen atom, but not other functional group in the molecule, organopolysiloxanes having one silicon-bonded alkenyl group, but not other functional group in the molecule, non-functional organopolysiloxanes having neither silicon-bonded hydrogen atoms nor silicon-bonded alkenyl groups (so-called dimethylsilicone oil), organic solvents, crepe hardening inhibitors, plasticizers, thixotropic agents, pigments, dyes, and mildew-proofing agents.

As described above, the inventive composition not only contains essential components (A) to (F), but may also contain optional other components. Of the optional components, i.e., those components pertinent to hydrosilylation addition reaction, specifically, component (G) may contain an alkenyl group, the adhesive component (organosilicon compound) other than component (E) may contain an alkenyl and/or SiH group, and the organopolysiloxane among the other components may contain one alkenyl group or one SiH group. Therefore, when the composition contains these optional components, the total amount (moles or number) of SiH groups per mole (or number) of total silicon-bonded alkenyl groups in the components is determined based on the overall composition containing the essential components and the optional components.

Specifically, the total amount of SiH groups per mole of total silicon-bonded alkenyl groups in the overall composition is 1 to 10 moles, preferably 1.2 to 9 moles, more preferably 1.5 to 8 moles (moles corresponding to number). If the total amount of SiH groups is less than 1 mole per mole of total silicon-bonded alkenyl groups in the composition, the resulting composition may not cure fully or develop a satisfactory bonding force. If the amount exceeds 10 moles, the resulting silicone rubber cured product may have extremely low heat resistance.

Preparation of Addition-Curable Liquid Silicone Rubber Composition

The addition-curable liquid silicone rubber composition may be prepared by intimately mixing the above-described components (A) to (F) and other optional components including component (G).

The addition-curable liquid silicone rubber composition is liquid at 25° C. and preferably has a viscosity at 25° C. of 1 to 1,000 Pa·s, more preferably 10 to 500 Pa·s as measured by the method of JIS K-7117-1: 1999. Within this range of viscosity, the composition is advantageously used in coating an airbag base fabric therewith because of the unlikelihood of uneven coating and adhesion failure after curing.

Airbag Base Fabric

Typically, the airbag base fabric (i.e., base material of fiber cloth) on which a silicone rubber layer in the form of a cured product of the inventive composition is formed may be any of well-known fabrics. Examples include woven fabrics made of synthetic fibers, for example, various types of polyamide fibers such as nylon 66, nylon 6, and aramid fibers and various types of polyester fibers such as polyethylene terephthalate (PET) and polybutylene terephthalate (PBT).

Preparation of Airbag

By coating the addition-curable liquid silicone rubber composition to at least one surface, especially to one surface of an airbag base fabric (i.e., base material of fiber cloth) and heat curing the composition in a drying oven or the like, a silicone rubber layer (i.e., cured coating layer) is formed on the base fabric. Using the resulting silicone rubber-coated base fabric, an airbag can be prepared.

Although any conventional method may be used in coating the addition-curable liquid silicone rubber composition onto the airbag base fabric, coating by a knife coater is preferred. The thickness of a coating layer (or surface coating weight) is typically 10 to 100 g/m$^2$, preferably 12 to 90 g/m$^2$, and more preferably 15 to 80 g/m$^2$.

The addition-curable liquid silicone rubber composition may be cured under well-known curing conditions by any well-known curing method. Specifically, the composition may be cured by heating at 100 to 200° C. for 1 to 30 minutes.

When the airbag base fabric having a silicone rubber layer on at least one surface thereof (silicone rubber-coated airbag base fabric) is processed into an airbag, one exemplary method involves bonding two plain-weave pieces, which have been coated on the airbag interior side with silicone rubber, along their periphery with an adhesive, and stitching the pieces along the adhesive layer together. An alternative method involves previously processing an airbag base fabric into hollow-weave shape, coating the fabric on its interior side with the addition-curable liquid silicone rubber composition to the predetermined coating weight, and curing the coating under the predetermined curing conditions as mentioned above. Although the adhesive used herein may be any of well-known adhesives, silicone-based adhesives known as seam sealants are preferred from the standpoints of bonding force and bond durability.

In this way, there is obtained an airbag comprising a cured coating of the addition-curable liquid silicone rubber composition on an airbag base fabric. Since the adhesion of the silicone rubber coating layer to the airbag base fabric and the adhesion durability are improved, the airbag is of great worth in industrial utilization.

EXAMPLES

Preparation Examples, Examples and Comparative Examples are given below for further illustrating the invention although the invention is not limited thereto. It is noted that the viscosity is measured at 25° C. by a rotational viscometer according to JIS K 7117-1:1999.

Preparation Example 1

In a kneader, 60 parts by weight of a molecular both end vinyldimethylsiloxy-capped dimethylpolysiloxane (A1) having a viscosity of 30,000 mPa·s at 25° C. and a weight average DOP of 750, 8 parts by weight of hexamethyldisilazane, 2 parts by weight of water, and 40 parts by weight of finely divided silica (C1) having a BET specific surface area of 300 $m^2$/g and a $Na^+$ ion content of 0.16 wt % as $Na_2O$ (Aerosil 300 by Nippon Aerosil Co., Ltd.) were admitted and mixed at room temperature for 1 hour. Then the temperature was elevated to 150° C., and mixing was continued for 2 hours. Thereafter, the temperature was lowered to room temperature, and 30 parts by weight of molecular both end vinyldimethylsiloxy-capped dimethylpolysiloxane (A1) having a viscosity of 30,000 mPa·s at 25° C. and a weight average DOP of 750 was added to the mixture, which were mixed until uniform, yielding a base compound (1).

Preparation Example 2

In a kneader, 60 parts by weight of a molecular both end vinyldimethylsiloxy-capped dimethylpolysiloxane (A1) having a viscosity of 30,000 mPa·s at 25° C. and a weight average DOP of 750, 8 parts by weight of hexamethyldisilazane, 2 parts by weight of water, and 40 parts by weight of wet silica (C2) having a BET specific surface area of 200 $m^2$/g and a $Na^+$ ion content of 0.16 wt % as $Na_2O$ (Nipsil LP by Tosoh Silica Co., Ltd.) were admitted and mixed at room temperature for 1 hour. Then the temperature was elevated to 150° C., and mixing was continued for 2 hours. Thereafter, the temperature was lowered to room temperature, and 30 parts by weight of molecular both end vinyldimethylsiloxy-capped dimethylpolysiloxane (A1) having a viscosity of 30,000 mPa·s at 25° C. and a weight average DOP of 750 was added to the mixture, which were mixed until uniform, yielding a base compound (2).

Example 1

Composition A (total SiH groups/total vinyl groups=5.1 mol/mol, viscosity 180 Pa·s) was prepared by mixing 110 parts by weight of base compound (1) in Preparation Example 1 with 58 parts by weight of dimethylpolysiloxane (A1) having a viscosity of 30,000 mPa·s at 25° C. and a weight average DOP of 750, 9.5 parts by weight of molecular both end dimethylhydrogensiloxy-capped dimethylsiloxane/methylhydrogensiloxane copolymer (B1) having on the average four silicon-bonded hydrogen atoms on molecular side chains (weight average DOP 18, SiH content 0.0035 mol/g), 0.64 part by weight of 3-isocyanatopropyltriethoxysilane (E), 0.27 part by weight of zirconium tetraacetylacetonate (F1), 0.09 part by weight of 1-ethynylcyclohexanol as reaction inhibitor, and 0.2 part by weight of a dimethylpolysiloxane solution (D) containing chloroplatinic acid/1,3-divinyltetramethyldisiloxane complex in a platinum content of 1 wt % for 1 hour.

Adhesion Test

Composition A was coated on an airbag nylon 66 base fabric (210 deniers) or PET base fabric (495 deniers) in a surface coating weight of 25-30 g/$m^2$ and heat cured in a drier at 180° C. for 1 minute, yielding the airbag base fabric coated with the silicone rubber cured product. The silicone rubber-coated nylon or PET fabric was evaluated for adhesion by the method of ISO 5981 using a scrub tester (Servonetic Control Instruments Ltd.). After 1,500 cycles of the scrub test, the coating section was visually observed to see any failure. The sample was rated OK when the silicone rubber layer was not peeled from the coating surface and NG when peeled.

Adhesion Test After Durability Test

Composition A was coated on an airbag nylon 66 base fabric (210 deniers) or PET base fabric (495 deniers) in a surface coating weight of 25-30 g/$m^2$ and heat cured in a drier at 180° C. for 1 minute, yielding the airbag base fabric coated with the silicone rubber cured product. The silicone rubber-coated nylon or PET fabric was subjected to a heat resistance test in a drier at 120° C. for 400 hours and a wet heat resistance test in a constant temperature/humidity bath at temperature 70° C., humidity 95% for 400 hours. The silicone rubber-coated nylon or PET fabric after the durability tests was evaluated for adhesion by the method of ISO 5981 using a scrub tester (Servonetic Control Instruments Ltd.). After 1,500 cycles of the scrub test, the coating section was visually observed to see any failure. The sample was rated OK when the silicone rubber layer was not peeled from the coating surface and NG when peeled.

Example 2

Composition B (total SiH groups/total vinyl groups=5.2 mol/mol, viscosity 50 Pa·s) was prepared by mixing 75 parts by weight of base compound (1) in Preparation Example 1 with 45.5 parts by weight of a molecular both end vinyldimethylsiloxy-capped dimethylpolysiloxane (A2) having a viscosity of 1,000 mPa·s at 25° C. and a weight average DOP of 200, 5 parts by weight of a molecular both end vinyldimethylsiloxy-capped dimethylpolysiloxane (A3) having a viscosity of 5,000 mPa·s at 25° C. and a weight average DOP of 450, 5 parts by weight of an organopolysiloxane resin (G) of 3-D network structure consisting of 39.5 mol % of $(CH_3)3SiO_{1/2}$ units, 6.5 mol % of $(CH_3)_2(CH_2\!=\!CH)SiO_{1/2}$ units, and 54 mol % of $SiO_2$ units and having a weight average molecular weight of 6,000, 6.4 parts by weight of molecular both end trimethylsiloxy-capped dimethylsiloxane/methylhydrogensiloxane copolymer (B2) having on the average 45 silicon-bonded hydrogen atoms on molecular side chains (weight average DOP 62, SiH content 0.011 mol/g), 0.25 part by weight of 3-isocyanatopropyltriethoxysilane (E), 0.40 part by weight of tetraoctyl titanate (F2), 0.05 part by weight of 1-ethynylcyclohexanol, and 0.22 part by weight of a dimethylpolysiloxane solution (D) containing chloroplatinic acid/1,3-divinyltetramethyldisiloxane complex in a platinum content of 1 wt % for 1 hour. The composition was subjected to the adhesion test and the adhesion test after durability test as in Example 1, with the results shown in Table 1.

Example 3

Composition C (total SiH groups/total vinyl groups=5.2 mol/mol, viscosity 30 Pa·s) was prepared as in Example 2 except that base compound (1) was replaced by the same amount of base compound (2). It was subjected to the adhesion test and the adhesion test after durability test as in Example 1, with the results shown in Table 1.

Comparative Example 1

Composition D (total SiH groups/total vinyl groups=5.1 mol/mol, viscosity 170 Pa·s) was prepared as in Example 1 aside from using 0.72 part by weight of γ-glycidoxypropylmethyldiethoxysilane instead of 0.64 part by weight of 3-isocyanatopropyltriethoxysilane (E). It was subjected to the adhesion test and the adhesion test after durability test as in Example 1, with the results shown in Table 1.

Comparative Example 2

Composition E (total SiH groups/total vinyl groups=5.1 mol/mol, viscosity 170 Pa·s) was prepared as in Example 1 aside from omitting zirconium tetraacetylacetonate (F1).

It was subjected to the adhesion test and the adhesion test after durability test as in Example 1, with the results shown in Table 1.

Comparative Example 3

Composition F (total SiH groups/total vinyl groups=5.2 mol/mol, viscosity 45 Pa·s) was prepared as in Example 2 aside from using 0.28 part by weight of γ-glycidoxypropylmethyldiethoxysilane instead of 0.25 part by weight of 3-isocyanatopropyltriethoxysilane (E). It was subjected to the adhesion test and the adhesion test after durability test as in Example 1, with the results shown in Table 1.

Comparative Example 4

Composition G (total SiH groups/total vinyl groups=5.2 mol/mol, viscosity 25 Pa·s) was prepared as in Example 3 aside from using 0.28 part by weight of γ-glycidoxypropylmethyldiethoxysilane instead of 0.25 part by weight of 3-isocyanatopropyltriethoxysilane (E). It was subjected to the adhesion test and the adhesion test after durability test as in Example 1, with the results shown in Table 1.

TABLE 1

| | Example | | | Comparative Example | | | |
|---|---|---|---|---|---|---|---|
| | 1 | 2 | 3 | 1 | 2 | 3 | 4 |
| Composition | A | B | C | D | E | F | G |
| <Adhesion test> | | | | | | | |
| Nylon 66 fabric | OK | OK | OK | OK | OK | OK | OK |
| PET fabric | OK | OK | OK | OK | OK | OK | OK |
| <Adhesion test after 120° C./400 hr> | | | | | | | |
| Nylon 66 fabric | OK | OK | OK | OK | OK | OK | OK |
| PET fabric | OK | OK | OK | NG | OK | NG | NG |
| <Adhesion test after 70° C./95%/400 hr> | | | | | | | |
| Nylon 66 fabric | OK | OK | OK | NG | NG | NG | NG |
| PET fabric | OK | OK | OK | NG | NG | NG | NG |

The invention claimed is:

1. An addition-curable liquid silicone rubber composition for airbags, comprising as essential components:
   (A) 100 parts by weight per a total weight of the rubber composition of an organopolysiloxane containing at least two silicon-bonded alkenyl groups per molecule, having a weight average degree of polymerization of 100 or more and less than 1,000, and being liquid at 25° C.,
   (B) an organohydrogenpolysiloxane containing at least two silicon-bonded hydrogen atoms (or SiH groups) per molecule, and being liquid at 25° C., in an amount to provide 1 to 10 moles of SiH groups in component (B) per mole of total silicon-bonded alkenyl groups in component (A),
   (C) 1 to 50 parts by weight per 100 parts by weight of component (A) of divided silica having a BET specific surface area of at least 50 $m^2/g$,
   (D) a hydrosilylation reaction catalyst in an amount to provide 1 to 500 ppm by weight of catalyst metal element based on the total weight of components (A) to (C),
   (E) 0.1 to 10 parts by weight per 100 parts by weight of component (A) of an organic compound containing 3-isocyanatopropyltrimethoxy silane or 3-isocyanatopropyltriethoxysilane, and
   (F) 0.1 to 5 parts by weight per 100 parts by weight of component (A) of at least one condensation catalyst selected from organotitanium compounds, organozirconium compounds, and organoaluminum compounds.

2. The addition-curable liquid silicone rubber composition of claim 1 wherein the divided silica as component (C) is a wet silica having a Na+ion content of up to 0.35% by weight calculated as $Na_2O$.

3. The addition-curable liquid silicone rubber composition of claim 1, further comprising (G) an organopolysiloxane resin of three-dimensional network structure in an amount of 0.1 to 100 parts by weight per 100 parts by weight of component (A), the three-dimensional network structure comprising branched chain siloxane units of at least one type selected from trifunctional $R^3SiO_{3/2}$ units and tetrafunctional $SiO_2$ units, where $R^3$ is each independently a substituted or unsubstituted monovalent hydrocarbon group of 1 to 12 carbon atoms.

4. An airbag comprising an airbag base fabric and a cured film of the addition-curable liquid silicone rubber composition of claim 1 thereon.

5. The addition-curable liquid silicone rubber composition of claim 1 wherein the component (E) is comprised at 0.25 to 5 parts by weight per 100 parts by weight of component (A).

6. An addition-curable liquid silicone rubber composition for airbags, comprising as essential components:
- (A) 100 parts by weight per a total weight of the rubber composition of an organopolysiloxane containing at least two silicon-bonded alkenyl groups per molecule, having a weight average degree of polymerization of 100 to 2,000, and being liquid at 25° C.,
- (B) an organohydrogenpolysiloxane containing at least two silicon-bonded hydrogen atoms (or SiH groups) per molecule, and being liquid at 25° C., in an amount to provide 1 to 10 moles of SiH groups in component (B) per mole of total silicon-bonded alkenyl groups in component (A),
- (C) 1 to 50 parts by weight per 100 parts by weight of component (A) of divided silica having a BET specific surface area of at least 50 $m^2/g$,
- (D) a hydrosilylation reaction catalyst in an amount to provide 1 to 500 ppm by weight of catalyst metal element based on the total weight of components (A) to (C),
- (E) 0.25 to 5 parts by weight per 100 parts by weight of component (A) of an organic compound containing 3-isocyanatopropyltrimethoxy silane or 3-isocyanato-propyltriethoxysilane, and
- (F) 0.1 to 5 parts by weight per 100 parts by weight of component (A) of at least one condensation catalyst selected from organotitanium compounds, organozirconium compounds, and organoaluminum compounds.

* * * * *